(12) United States Patent
Okuda

(10) Patent No.: US 8,194,202 B2
(45) Date of Patent: Jun. 5, 2012

(54) ELECTRO-OPTICAL DEVICE AND ELECTRONIC APPARATUS

(75) Inventor: Tatsumi Okuda, Motosu (JP)

(73) Assignee: Sony Corporation, Tokyo (JP)

( * ) Notice: Subject to any disclaimer, the term of this patent is extended or adjusted under 35 U.S.C. 154(b) by 754 days.

(21) Appl. No.: 12/046,898

(22) Filed: Mar. 12, 2008

(65) Prior Publication Data

US 2009/0079894 A1    Mar. 26, 2009

(30) Foreign Application Priority Data

Apr. 5, 2007   (JP) .................................. 2007-099087

(51) Int. Cl.
    *G02F 1/1333* (2006.01)
(52) U.S. Cl. ................ 349/58; 349/59; 349/60
(58) Field of Classification Search ............... 349/58–60
    See application file for complete search history.

(56) References Cited

U.S. PATENT DOCUMENTS

| | | | |
|---|---|---|---|
| 6,741,299 B2 * | 5/2004 | Fukayama et al. | 349/58 |
| 7,209,195 B2 * | 4/2007 | Lin | 349/58 |
| 7,271,861 B2 | 9/2007 | Yamazaki | |
| 7,324,172 B2 | 1/2008 | Yamazaki | |
| 2007/0252922 A1* | 11/2007 | Oohira | 349/58 |

FOREIGN PATENT DOCUMENTS

| | | |
|---|---|---|
| JP | 2003-202550 | 7/2003 |
| JP | 2004-240239 | 8/2004 |
| JP | 2004-258291 | 9/2004 |
| JP | 2006-011163 | 1/2006 |

* cited by examiner

*Primary Examiner* — Mark Robinson
*Assistant Examiner* — Charles Chang
(74) *Attorney, Agent, or Firm* — K&L Gates LLP

(57) ABSTRACT

The invention relates to an electro-optical device having an electro-optical panel and a supporting frame that supports the electro-optical panel either directly or indirectly. The supporting frame of the electro-optical device according to an aspect of the invention includes: a resin base frame member; and a metal member that has an embedded portion that is covered inside the resin base frame member and an exposed portion that is exposed from the resin base frame member. In the configuration of the electro-optical device of the invention, the exposed portion of the metal member has an inner exposed portion that is exposed at a middle face of the inside of the supporting frame viewed along the thickness direction of the supporting frame. At least one of the electro-optical panel, which is supported inside the supporting frame, and other member is in contact with the inner exposed portion of the metal member.

7 Claims, 8 Drawing Sheets

ELECTRO-OPTICAL DEVICE AND ELECTRONIC APPARATUS

The entire disclosure of Japanese Patent Application No. 2007-099087, filed Apr. 5, 2007 is expressly incorporated by reference herein.

BACKGROUND

1. Technical Field

The present invention relates to an electro-optical device and an electronic apparatus. In particular, the invention relates to the structure of a supporting frame that supports an electro-optical panel either directly or indirectly.

2. Related Art

In the typical configuration of a liquid crystal display medium that constitutes a part of an electro-optical device of the related art, a liquid crystal panel, which is an electro-optical panel, is placed over a backlight, which is a surface illumination device, that is, planar illumination device, so that the liquid crystal panel and the backlight overlap each other in a plan view. The backlight illuminates the liquid crystal panel from the back thereof. By means of illuminating light coming from the surface illumination device (backlight) of the electro-optical device, the electro-optical panel (liquid crystal panel) thereof displays images in a variety of desired modes. A surface illumination device that is known in the technical field to which the invention pertains is provided with a light source (herein correctively referred to as "a" light source) such as light emitting diodes (LED) or the like and further with an optical waveguide board. In such a known configuration, light that has been emitted from the light source enters an edge face of the optical waveguide board that constitutes a plane of incidence. Then, the light that has entered the optical waveguide board goes out from the upper surface thereof that constitutes a plane of emergence. The optical waveguide board of the surface illumination device is set at a position that corresponds to the drive region, that is, display area, of the electro-optical panel in a plan view.

A supporting frame that is made of, for example, a white resin material supports, either directly or indirectly, the surface illumination device and the electro-optical panel. In such a configuration of the related art, the supporting frame fixes the plan positions of the optical waveguide board and the electro-optical panel in an overlapping manner so as to make up a single display unit. In some cases, a metal frame, which is made of a metal material such as a stainless steel, is attached to the rear surface of the supporting frame.

In the configuration of a supporting frame of the related art, a resin is adhered to partial region(s) of a metal frame that has a box-like shape in such a manner that the resin and the metal frame make up a frame unit. For example, a resin is adhered to the peripheral region of the metal frame and the inner wall thereof. A few examples of such a configuration are described in JP-A-2003-202550 and JP-A-2004-240239. Since this type of supporting frame is made up of the resin and the metal frame that are adhered to each other, it offers some advantages such as improved mechanical strength and easier assembly. Therefore, the resin-adhered metal frame makes it possible to reduce the size and thickness of the supporting frame with such advantageous features. The supporting frame provides a mechanical support to the constituent elements of a backlight such as a light source, an optical waveguide board, and optical sheets and/or an electro-optical panel at the white resin regions thereof. With such a configuration, the electro-optical panel can utilize light that has been emitted from the backlight in an efficient manner.

There is an increasing demand for a compact electro-optical device. As the size and thickness thereof has become smaller in recent years, an electro-optical panel of these days is more susceptible to the adverse effects of static electricity. Static electricity could significantly affect the display of an electro-optical panel due to its fundamental reasons. As explained above, the supporting frame of the related art provides a mechanical support to the constituent elements of a surface illumination device and/or an electro-optical panel at the white resin regions thereof. With such a configuration, it is hard to discharge generated static electricity to the outside thereof, which is likely to cause electrostatic charging. Therefore, there is a risk that the electro-optical panel becomes damaged and/or causes malfunction due to the electrostatic charging. In addition, charged static electricity becomes discharged when any electro-conductive object such as a finger of a viewing person approaches the electro-optical panel or when it contacts the electro-optical panel, which results in a noise problem.

Moreover, since the supporting frame of the related art described above is mainly made of a metal frame as a base frame material and a resin that is adhered to partial regions of the main-body metal frame so as to support the electro-optical panel and the like, it is likely that the strength of adhesion of the resin to the base metal frame is poor. Furthermore, it is practically impossible, or at best difficult, to ensure the positional precision of the resin regions. Still furthermore, it is also difficult to achieve a high rigidity (mechanical strength) of the supporting frame as a whole. Therefore, there is a limit to reduction in the size and thickness of an electro-optical device that can be achieved with the above-described configuration of the supporting frame of the related art.

SUMMARY

An advantage of some aspects of the invention is to provide an electro-optical device that is free from any malfunction due to static electricity, which is achieved by a unique structure of a supporting frame that is capable of easily and reliably discharge static electricity. Moreover, the invention provides, as an advantage of some aspects thereof, an electro-optical device that features a small, compact, and slim body, which is made available thanks to a unique supporting frame that offers an improvement in the resin-metal adhesion strength, structural precision, and mechanical strength thereof.

In order to address the above-identified problem without any limitation thereto, the invention provides, as a first aspect thereof, an electro-optical device having an electro-optical panel and a supporting frame that supports the electro-optical panel either directly or indirectly, the supporting frame of the electro-optical device including: a resin base frame member; and a metal member that has an embedded portion that is covered inside the resin base frame member and an exposed portion that is exposed from the resin base frame member, wherein the exposed portion of the metal member has an inner exposed portion that is exposed at a middle face of the inside of the supporting frame viewed along the thickness direction of the supporting frame; and at least one of the electro-optical panel, which is supported inside the supporting frame, and other member is in contact with the inner exposed portion of the metal member.

In the configuration of the electro-optical device according to the first aspect of the invention described above, the exposed portion of the metal member has an inner exposed portion that is exposed at a middle face of the inside of the supporting frame viewed along the thickness direction of the supporting frame; and at least one of the electro-optical panel, which is supported inside the supporting frame, and other member that is interposed between the inner exposed portion of the metal member and the electro-optical panel is in contact with the inner exposed portion of the metal member. With such a structure, it is possible to release and discharge, via the metal member, static electricity that is charged in the electro-optical panel and the members/components of the electro-optical device that are supported inside the supporting frame, especially, static electricity that is charged in the member that lies at the middle face of the inside of the supporting frame viewed along the thickness direction of the supporting frame. Therefore, the electro-optical device according to the first aspect of the invention described above makes it possible to significantly reduce the risk of defective display due to the static electricity. In addition, in the configuration of the electro-optical device according to the first aspect of the invention described above, the supporting frame of the electro-optical device is made up of a resin base frame member and a metal member in such a manner that the resin base frame member and the metal member make up a single-piece frame unit. The metal member has an embedded portion that is covered inside the resin base frame member and an exposed portion that is exposed from the resin base frame member. Roughly speaking, the surface of the resin base frame member surrounds each of the exposed portions of the metal member. Such a structure increases the area of adhesion between the resin base frame member and the metal member formed as a single-piece frame unit. With the enhanced adhesion between the resin base frame member and the metal member, the electro-optical device according to the first aspect of the invention described above makes it possible not only to improve the structural precision in the frame shape of the supporting frame but also to increase the mechanical strength of the supporting frame.

In the configuration of the electro-optical device according to the first aspect of the invention described above, it is preferable that the embedded portion of the metal member should have a bent cross-sectional shape or a curved cross-sectional shape taken along a section of the supporting frame. With such a structure, since the embedded portion of the metal member that is covered inside (i.e., covered by) the resin base frame member has a bent cross-sectional shape or a curved cross-sectional shape taken along a section of the supporting frame, it is possible to increase the strength of adhesion between the resin base frame member and the metal member. Therefore, the electro-optical device having a preferred configuration described above makes it possible not only to further improve the structural precision in the frame shape of the supporting frame but also to further increase the mechanical strength of the supporting frame.

In the configuration of the electro-optical device according to the first aspect of the invention described above, it is preferable that the exposed portion of the metal member should have an outer exposed portion that is exposed at the outside of the supporting frame; and the inner exposed portion of the metal member and the outer exposed portion of the metal member should be conductively connected with (i.e., electrically "connected" to) each other. With such a structure, because at least one of the electro-optical panel, which is supported inside the supporting frame, and the above-mentioned other member is in contact with the inner exposed portion of the metal member, and further because the inner exposed portion of the metal member and the outer exposed portion thereof is conductively connected with each other, it is possible to easily release and discharge static electricity that is charged in the electro-optical panel or the above-mentioned other member to the outside thereof via the outer exposed portion of the metal member. Such a configuration makes it possible to provide a discharge route through which charged static electricity can be released, which is easily made available by, for example, electrically connecting the outer exposed portion of the metal member to a metal frame, a ground potential of a circuit substrate, or the like.

In the configuration of the electro-optical device according to the first aspect of the invention described above, it is preferable that the surface of the inner exposed portion of the metal member should constitute at least a part of a supporting surface of the supporting frame that supports at least one of the electro-optical panel, which is supported inside the supporting frame, and the above-mentioned other member. With such a preferred configuration, the use of the surface of the inner exposed portion of the metal member as at least a part of a supporting surface of the supporting frame that supports at least one of the electro-optical panel and the above-mentioned other member ensures the structural precision of the supporting surface at the time of molding of the supporting frame. In particular, if the resin base frame member supports the inner exposed portion of the metal member, the surface of which constitutes the supporting surface, from the rear/back/bottom thereof, it is possible to further ensure the supporting strength thereof. Therefore, it is possible to further enhance the precision in positional determination.

It is preferable that the electro-optical device according to the first aspect of the invention described above should further have a surface illumination device that overlaps the electro-optical panel in a plan view, wherein the supporting frame supports members that make up the surface illumination device. With such a configuration, the above-mentioned other member corresponds to those that make up the surface illumination device. Therefore, it is possible to make the positional determination of the electro-optical panel with respect to, that is, relative to, the surface illumination device.

In the configuration of the electro-optical device according to the first aspect of the invention described above, it is preferable that an external electrode should be formed on the outer surface of the electro-optical panel; and the external electrode should be electrically connected to the exposed portion of the metal member. With such a preferred configuration, it is possible to release and discharge static electricity via the external electrode and then via the exposed portion of the metal member. Although it is more preferable that the external electrode should be electrically connected to the inner exposed portion of the metal member, it may be electrically connected to the outer exposed portion thereof.

In the configuration of the electro-optical device according to the first aspect of the invention described above, it is preferable that the metal member should be made of a metal plate material. If the metal member is made of a metal plate material, it is easier to form a bent or curved shape thereof. In addition, it is easier to form a flat supporting surface.

In order to address the above-identified problem without any limitation thereto, the invention provides, as a second aspect thereof, an electronic apparatus that is provided with the electro-optical device according to the first aspect of the invention and a control section that controls the electro-optical device. A non-limiting example of the electronic apparatus according to the second aspect of the invention is an electronic device having a display function, which is provided with the electro-optical device according to the first aspect of the invention as its display unit/portion and the control section as its display controlling unit/portion.

BRIEF DESCRIPTION OF THE DRAWINGS

The invention will be described with reference to the accompanying drawings, wherein like numbers reference like elements.

FIG. 13A is a close-up sectional view that schematically illustrates an example of the configuration of one sub pixel P of the electro-optical panel that can be adopted in an exemplary embodiment of the invention, whereas

DESCRIPTION OF EXEMPLARY EMBODIMENTS

First Embodiment

Figure 1:
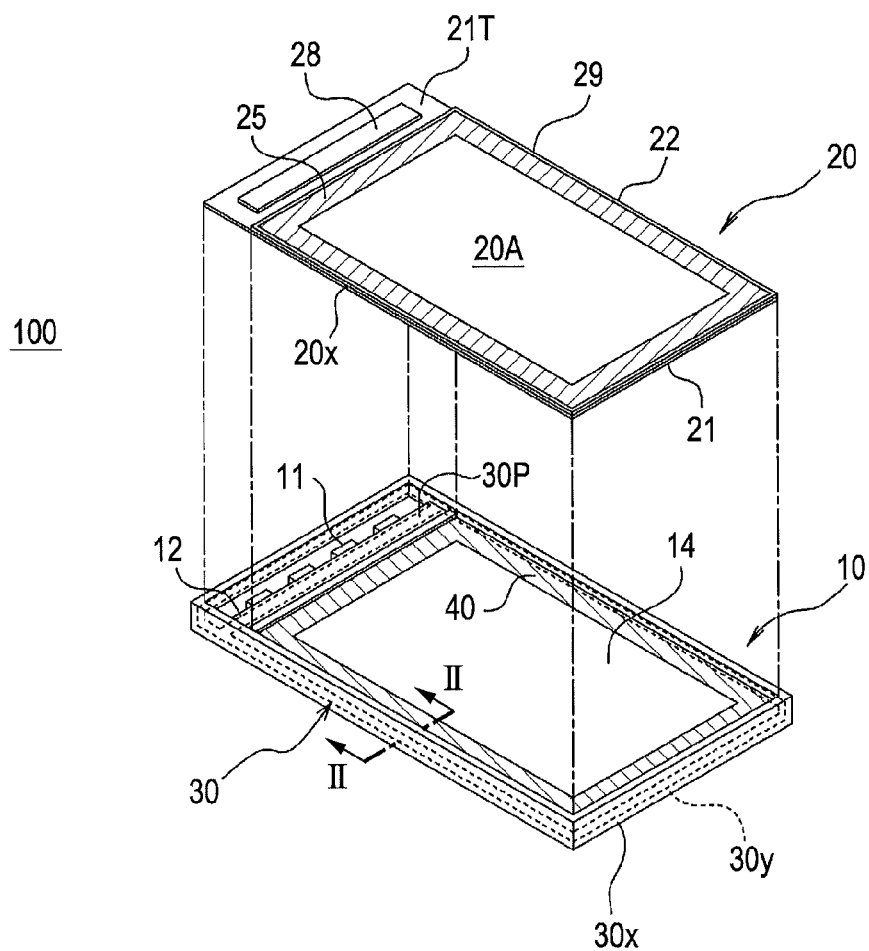
FIG. 1 is an exploded perspective view that schematically illustrates an example of the general configuration of an electro-optical device according to a first embodiment of the invention.
Figure 2:
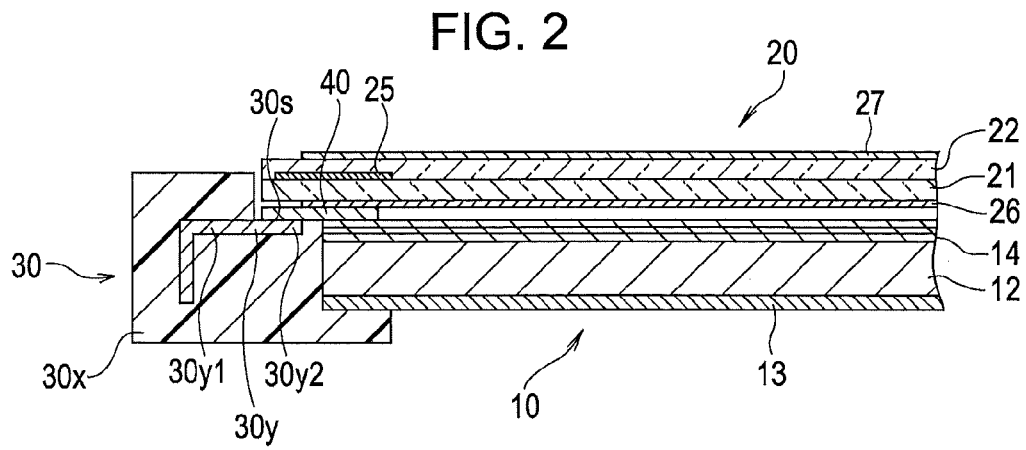
FIG. 2 is a close-up sectional view taken along the line II-II of FIG. 1.

FIG. 1 is an exploded perspective view that schematically illustrates an example of the general configuration of an electro-optical device 100 according to a first embodiment of the invention. FIG. 2 is a close-up (i.e., enlarged) sectional view taken along the line II-II of FIG. 1. The electro-optical device 100 according to the present embodiment of the invention is provided with an illumination unit 10, an electro-optical panel 20, and a supporting frame 30. The illumination unit 10 is configured as a surface light source. The electro-optical panel 20 is placed over the illumination unit 10 at the proximal region thereof in such a manner that they overlap each other in a plan view. The supporting frame 30 supports the illumination unit 10 and the electro-optical panel 20 either directly or indirectly.

The illumination unit 10, which is provided at the back of the electro-optical panel 20, functions as a backlight. In an example illustrated in FIG. 1, the illumination unit 10 is configured as a so-called side-light-type (i.e., edge-light-type) illumination device. The illumination unit 10 is provided with a light source(s) 11, an optical waveguide board 12, a reflecting plate 13, and a singularity or a plurality of (i.e., one or more) optical sheet(s) 14. The light source 11 is made up of a singularity or a plurality of point light source(s). A non-limiting example of the point light source is a light emitting diode (LED). Light emitted from the light source 11 propagates inside the optical waveguide board 12 and then goes out from the upper surface thereof. The reflecting plate 13 is provided at the back of, specifically, on the rear face of, the optical waveguide board 12. The optical sheet 14 is provided over the surface of the optical waveguide board 12. A few non-limiting examples of the optical sheet 14 include a light-diffusing sheet and a light-condensing (i.e., light-focusing) prism sheet.

The electro-optical panel 20 is made up of a substrate 21, another substrate 22, and an electro-optical material that is sandwiched therebetween. Each of the substrates 21 and 22 is made of, for example, glass or the like. A non-limiting example of the electro-optical material that is sandwiched therebetween is liquid crystal. In the illustrated example, the electro-optical panel 20 is configured as a liquid display panel, although the liquid crystal (electro-optical material) is not illustrated in the drawing. A polarizing plate, or a polarizing film, 26 is adhered to the outer surface of the substrate 21, which is opposite the liquid-crystal-side surface thereof. On the other hand, a polarizing plate 27 is adhered to the outer surface of the substrate 22. The substrate 21 has a protruding region 21T. The protruding region 21T of the substrate 21 extends outward beyond the outer edge of the substrate 22 so that the protruding region 21T of the substrate 21 does not overlap the substrate 22 in a plan view. A variety of wiring patterns and lines is formed on the protruding region 21T of the substrate 21. These wiring patterns and lines extend from the drive region, that is, display area, 20A of the electro-optical panel 20. A driving circuit 28 is mounted on the protruding region 21T of the substrate 21. The driving circuit 28 is electrically connected to these wirings and lines. A wiring member that supplies power voltages, video signals, and the like, from an external source is attached to the protruding region 21T of the substrate 21. For example, a flexible printed circuit (FPC) board is connected to the protruding region 21T of the substrate 21. Note that the wiring member is not illustrated in the drawing.

In the configuration of the electro-optical device 100 according to the present embodiment of the invention, the electro-optical panel 20 has an ultra-thin panel structure, which is less than 0.5 mm in thickness. For example, the thickness of the electro-optical panel 20 is within a range from approximately 0.3 mm to approximately 0.4 mm. Such an ultra-thin panel structure of the electro-optical panel 20 is made available as a result of recent technological developments made in an effort to reduce the size and thickness of an electronic apparatus, a typical example of which is a liquid crystal display panel that is built in a mobile phone. As a component of such an ultra-slim electro-optical panel 20, a very-thin glass or plastic substrate having a thickness of approximately 0.1-0.3 mm is used for each of the substrates 21 and 22, though the material of the substrate is not limited to those described herein. Although each of these substrates has a sufficient impact resistance, it may be damaged easily during the production/assembly processes of the electro-optical panel due to careless or inadvertent handling thereof.

A light-shielding layer 25 is formed on the peripheral region of the electro-optical panel 20. The light-shielding layer 25 is formed in the shape of a frame in such a manner that it surrounds the drive region 20A of the electro-optical panel 20. In the illustrated example, the light-shielding layer 25 is formed at the inner-surface side of the substrate 22 (i.e., formed in the substrate 22). The light-shielding layer 25 provides a light-shielding region along the edges of the electro-optical panel 20 outside the drive region 20A thereof. The light-shielding layer 25 prevents any light from leaking through the peripheral region of the electro-optical panel 20 at which the operation of liquid crystal is not controlled well.

In the configuration of the electro-optical device 100 according to the present embodiment of the invention, the illumination unit 10 is fitted inside the supporting frame 30. The electro-optical panel 20 is housed inside the supporting frame 30 over the illumination unit 10. The supporting frame 30 is made of a material having a high optical reflectance. For example, the supporting frame 30 is made of a resin (insulating material) such as white polyethylene or the like. Although the original and main function of the supporting frame 30 is to support a backlight as a backlight case, in most cases, it is also used to roughly determine the installation position of the electro-optical panel 20 as in the present embodiment of the invention. The supporting frame 30 has, as its name indicates, the shape of a frame. Specifically, the supporting frame 30 is formed as a rectangular frame.

FIG. 1 illustrates a certain assembly state of the electro-optical device 100 according to the present embodiment of the invention. Specifically, in the illustrated assembly state, the electro-optical panel 20 is about to be assembled into the supporting frame 30 after the fitting of the illumination unit 10 in the supporting frame 30. After the sequential assembling of the light source 11, the optical waveguide board 12, the reflecting plate 13, and the optical sheet 14 in the supporting frame 30, a light-shielding double-faced adhesive tape 40, which is formed in the shape of a rectangular frame, is adhered onto the upper surface of the illumination unit 10. The light-shielding double-faced adhesive tape 40 is a double-sided tape having an adhesive layer at each of the front face and the rear face thereof. The light-shielding double-faced adhesive tape 40 further functions as a light-shielding sheet.

As illustrated in FIG. 2, the supporting frame 30 has an inner supporting surface 30s that is formed at the middle face of the inside of the supporting frame 30, which is defined as "middle face" when viewed along the thickness direction thereof. Note that the term "middle" should not be understood to be limited to the vertical center but be understood as somewhere between the top and bottom thereof. In the illustrated example, the optical waveguide board 12, the reflecting plate 13, and the optical sheet 14 are housed in the supporting frame 30 below the inner supporting surface 30s thereof. The rear face of the light-shielding double-faced adhesive tape 40 is adhered to both of the inner supporting surface 30s of the supporting frame 30 and the surface of the optical sheet 14. With such a structure, the light-shielding double-faced adhesive tape 40 fixes the position of the illumination unit 10 inside the supporting frame 30.

On the other hand, the peripheral region of the electro-optical panel 20 is adhered to front face of the light-shielding double-faced adhesive tape 40. With such a structure, the electro-optical panel 20 is held at the upper position inside the supporting frame 30, which is defined as "upper position" when viewed along the thickness direction thereof. That is, in addition to the function of fixing the position of the illumination unit 10 inside the supporting frame 30 as described above, the light-shielding double-faced adhesive tape 40 further fixes the position of the electro-optical panel 20 inside the supporting frame 30. With the exemplary configuration illustrated in FIG. 2, the light-shielding double-faced adhesive tape 40, which is adhered to both of the inner supporting surface 30s of the supporting frame 30 and the surface of the illumination unit 10, supports the peripheral region of the electro-optical panel 20.

The supporting frame 30 is made up of a resin base frame member 30x and a metal member 30y. The resin base frame member 30x and the metal member 30y make up a single frame unit (i.e., supporting frame 30). The resin base frame member 30x is made of the white resin described above, though not necessarily limited thereto. The metal member 30y is made of a metal material. A few non-limiting examples of the metal material of the metal member 30y are stainless steel and aluminum. The metal member 30y is configured as a metal plate. As understood from FIG. 1, in the illustrated exemplary configuration of the electro-optical device 100 according to the present embodiment of the invention, the metal member 30y is formed along, specifically, partially embedded in, the entire region of the supporting frame 30 so as to increase the mechanical strength (including but not necessarily limited to the rigidity) of the supporting frame 30. In order to reduce the thickness of the electro-optical device 100, it is necessary to reduce the thickness of the supporting frame 30. Generally speaking, as the thickness of the supporting frame 30 is reduced, its mechanical strength decreases. Notwithstanding the foregoing, in the illustrated exemplary configuration of the electro-optical device 100 according to the present embodiment of the invention, since the metal member 30y is formed along the entire region of the supporting frame 30, it is possible to maintain the mechanical strength thereof. In addition, in the illustrated exemplary configuration of the electro-optical device 100 according to the present embodiment of the invention, a bridge portion 30P is formed inside the outer rectangular chassis of the supporting frame 30. The bridge portion 30P extends along the edge face of the light source 11 (the edge face of each of the plurality of LEDs) and the edge face of the optical waveguide board 12.

The metal member 30y is also embedded in the bridge portion 30P. Having such a structure, the electro-optical device 100 according to the present embodiment of the invention features a further reinforced frame body. In addition to the increased mechanical strength, the electro-optical device 100 according to the present embodiment of the invention ensures a higher positional precision of each component/member thereof.

The entire body, or at least a part thereof, of the metal member 30y is either bent or curved (or both thereof). In the exemplary configuration of the electro-optical device 100 according to the present embodiment of the invention, the metal member 30y has the shape of an alphabet L (90-degree turned) when viewed in a cross section of the supporting frame 30 as shown in FIG. 2. Needless to say, the cross sectional shape of the metal member 30y should be in no case understood to be limited to the alphabet L. It may be bent in an alphabet V or bent in the shape of a crank. It may be bent in other form that is not specifically described herein. The metal member 30y may be curved in a cross section thereof. As a few non-limiting examples thereof, the metal member 30y may have the shape of an arc or an alphabet J when viewed in a cross section of the supporting frame 30.

In the illustrated exemplary configuration of the electro-optical device 100 according to the present embodiment of the invention, the metal member 30y is mainly embedded in, that is, covered by, the resin base frame member 30x whereas a part thereof is exposed on the surface of the supporting frame 30. In other words, the metal member 30y has an embedded portion 30y1 that is covered by the resin base frame member 30x and an exposed portion 30y2 that is exposed from, that is, not covered by, the resin base frame member 30x. In the illustrated exemplary configuration of the electro-optical device 100 according to the present embodiment of the invention, the exposed portion 30y2 of the metal member 30y constitutes an inner exposed portion thereof that is formed at the middle face of the inside of the supporting frame 30 viewed along the thickness direction thereof.

That is, in the illustrated example, the non-embedded portion (herein, the term "non-embedded" refers to the exposed portion, specifically, the aforementioned inner exposed portion) 30y2 of the metal member 30y is exposed at the inner supporting surface 30s of the supporting frame 30. In other words, the upper surface of the inner exposed portion 30y2 of the metal member 30y constitutes a part of the inner supporting surface 30s of the supporting frame 30.

During a resin molding process, the supporting frame 30 is formed while the upper surface of the exposed portion 30y2 of the metal member 30y is in contact with the inner surface of the cavity of a mold. In addition, in the configuration of the supporting frame 30 as a finished product after the molding process, the resin base frame member 30x securely supports the back (i.e., bottom) of the exposed portion 30y2 of the metal member 30y. For these reasons, the surface precision of the exposed portion 30y2 of the metal member 30y is very high. Therefore, the use of the upper surface of the exposed portion 30y2 of the metal member 30y as the inner supporting surface 30s of the supporting frame 30 ensures a considerable improvement in the precision of the positional determination of member/component supported thereby.

Moreover, since the uncovered portion 30y2 of the metal member 30y is exposed at the middle face of the inside of the supporting frame 30 viewed along the thickness direction thereof, it is possible not only to use the exposed portion 30y2 of the metal member 30y as the inner supporting surface 30s of the supporting frame 30 but also to release (i.e., discharge) static electricity that is charged in the members/components of the electro-optical device 100 to the metal member 30y, which are non-limiting advantageous effects of the invention. The structure of the supporting frame 30 described above is especially advantageous in view of the increasingly adverse effects of static electricity in accordance with the reduction in the size and thickness of the electro-optical device 100.

Figure 3:
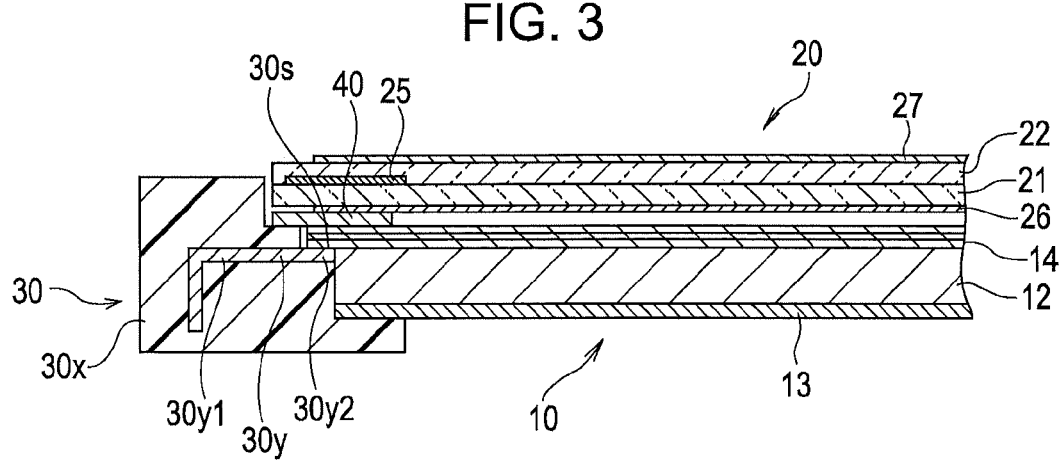
FIG. 3 is a close-up sectional view that schematically illustrates an example of another cross-sectional shape of the electro-optical device according to the first embodiment of the invention, which differs from the cross-sectional shape thereof illustrated in FIG. 2.

FIG. 3 is a close-up sectional view that schematically illustrates an example of another cross-sectional shape of the electro-optical device 100 according to the present embodiment of the invention, which differs from the cross-sectional shape thereof illustrated in FIG. 2. The cross-sectional shape illustrated in FIG. 3 is the same as that of FIG. 2 explained above in that the uncovered portion 30y2 of the metal member 30y is exposed at the inner supporting surface 30s of the supporting frame 30; however, the cross-sectional shape illustrated in FIG. 3 differs from that of FIG. 2 in that the exposed portion 30y2 of the metal member 30y supports not the aforementioned light-shielding double-faced adhesive tape 40 but the aforementioned optical sheet 14. In addition thereto, an inner end of the exposed portion 30y2 of the metal member 30y faces, and/or is in contact with, an edge face of the aforementioned optical waveguide board 12 so as to determine and fix the two-dimensional position of the optical waveguide board 12. That is, in the exemplary configuration of the electro-optical device 100 according to the present embodiment of the invention illustrated in FIG. 3, the inner supporting surface 30s of the supporting frame 30 includes not only the upper surface of the exposed portion 30y2 of the metal member 30y but also the inner end thereof. It should be noted that the inner supporting surface 30s of the supporting frame 30 corresponds to the aforementioned "supporting surface" of the invention.

Figure 4:
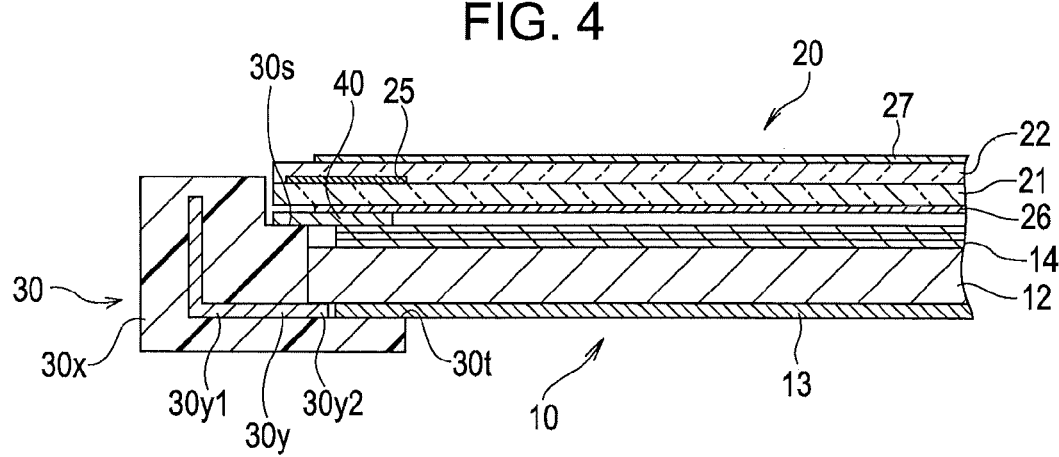
FIG. 4 is a close-up sectional view that schematically illustrates an example of still another cross-sectional shape of the electro-optical device according to the first embodiment of the invention, which differs from the cross-sectional shapes thereof illustrated in FIGS. 2 and 3.

FIG. 4 is a close-up sectional view that schematically illustrates an example of still another cross-sectional shape of the electro-optical device 100 according to the present embodiment of the invention, which differs from the cross-sectional shapes thereof illustrated in FIGS. 2 and 3. In the exemplary configuration of the electro-optical device 100 according to the present embodiment of the invention illustrated in FIG. 4, another inner supporting surface 30t is formed on the supporting frame 30 in addition to the inner supporting surface 30s thereof. The exposed portion 30y2 of the metal member 30y is formed on the inner supporting surface 30t of the supporting frame 30; that is, the inner supporting surface 30t of the supporting frame 30 supports the exposed portion 30y2 of the metal member 30y. The upper surface of the exposed portion 30y2 of the metal member 30y constitutes still another inner supporting surface that supports the optical waveguide board 12. When viewed in a cross section of the supporting frame 30, the metal member 30y has or resembles the shape of an alphabet L that is made up of a horizontal portion and a vertical portion. Specifically, the portion 30y2 of the metal member 30y that has the upper surface constituting the above-mentioned still another inner supporting surface extends horizontally in an outward direction (note that the extension thereof is covered and thus does not constitute the "exposed" portion 30y2). The metal member 30y is bent inside the resin base frame member 30x at the outer end (i.e., a bent point or a corner when viewed in a cross section) of the horizontal portion thereof in a perpendicularly upward direction. With such a structure, the electro-optical device 100 illustrated in FIG. 4 makes it possible to ensure a sufficient mechanical strength while reducing the cross-sectional area of the supporting frame 30. The above-explained cross-sectional configuration of the electro-optical device 100 illustrated in FIG. 4 may be modified in such a manner that, similar to the foregoing configurations illustrated in FIGS. 2 and 3, the upper surface of the exposed portion 30y2 of the metal member 30y constitutes a part of the inner supporting surface 30t of the supporting frame 30. In other words, the above-explained cross-sectional configuration of the electro-optical device 100 illustrated in FIG. 4 may be modified in such a manner that, similar to the foregoing configurations illustrated in FIGS. 2 and 3, the upper surface of the exposed portion 30y2 of the metal member 30y is at the same level (i.e., height) as the inner supporting surface 30t of the supporting frame 30.

Figure 5:
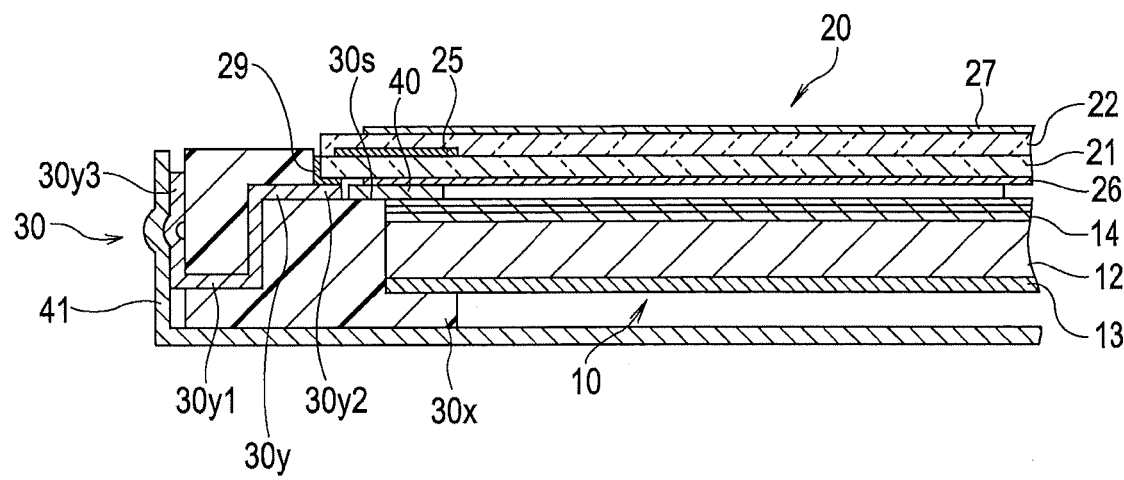
FIG. 5 is a close-up sectional view that schematically illustrates an example of still another cross-sectional shape of the electro-optical device according to the first embodiment of the invention, which differs from the cross-sectional shapes thereof illustrated in FIGS. 2, 3, and 4.

FIG. 5 is a close-up sectional view that schematically illustrates an example of still another cross-sectional shape of the electro-optical device 100 according to the present embodiment of the invention, which differs from the cross-sectional shapes thereof illustrated in FIGS. 2, 3, and 4. The cross-sectional shape illustrated in FIG. 5 is similar to that of FIG. 4 explained above in that the exposed portion 30y2 of the metal member 30y is formed on the inner supporting surface 30s of the supporting frame 30 and that the inner supporting surface 30s of the supporting frame 30 supports the exposed portion 30y2 of the metal member 30y; that is, the electro-optical device 100 according to the present embodiment of the invention illustrated in FIG. 5 has an inner exposed portion thereof that is formed inside the supporting frame 30; however, the cross-sectional shape illustrated in FIG. 5 differs from those of FIGS. 2, 3, and 4 in that another uncovered portion 30y3 of the metal member 30y is exposed at the outside of the supporting frame 30, which constitutes an outer exposed portion thereof. The inner exposed portion 30y2 and the outer exposed portion 30y3 are formed in the same single metal member 30y. With such a structure, the inner exposed portion 30y2 of the metal member 30y and the outer exposed portion 30y3 thereof are conductively "connected" with each other.

In the exemplary configuration of the electro-optical device 100 according to the present embodiment of the invention illustrated in FIG. 5, the inner exposed portion 30y2 of the metal member 30y is in contact with an external electrode 29 that is formed on the outer surface of the electro-optical panel 20. That is, the metal member 30y is electrically connected to the external electrode 29 and thus to the electro-optical panel 20. With such a structure, it follows that the external electrode 29 is electrically connected to the uncovered portion 30y3 of the metal member 30y that is exposed at the outside of the supporting frame 30. The above-described configuration can be suitably adopted so as to electrically connect the electro-optical panel 20 to the outside of the supporting frame 30 for a variety of reasons. As a non-limiting example thereof, it is conceivable to electrically connect a partial region of the electro-optical panel 20 to the external electrode 29 in order to release, that is, discharge, static electricity that is charged at the electro-optical panel 20.

In the exemplary configuration of the electro-optical device 100 according to the present embodiment of the invention illustrated in FIG. 5, a metal frame 41 is attached to the supporting frame 30. When the metal frame 41 is attached to the supporting frame 30, the metal frame 41 is in contact with and thus electrically connected to the outer exposed portion 30y3 of the metal member 30y. Such a configuration allows static electricity that has been charged at the electro-optical panel 20 to be released and discharged to the metal frame 41. In the illustrated example, the outer exposed portion 30y3 of the metal member 30y has an engaging latch projection, which is illustrated as a convex portion in the drawing, whereas the metal frame 41 has a corresponding engaging latch recess, which is illustrated as a concave portion in the drawing, although the illustrated engaging structure is a mere example and thus not intended to limit the scope of the invention. With such a structure, the metal frame 41 is directly attached to the outer exposed portion 30y3 of the metal member 30y. The above-described exemplary configuration illustrated in FIG. 5, which has, in addition to the metal frame 41, the outer exposed portion 30y3 of the metal member 30y that is exposed at the outside of the supporting frame 30, and in which the metal frame 41 are electrically connected to the outer exposed portion 30y3 of the metal member 30y in such a manner that the inner exposed portion 30y2 of the metal member 30y and the outer exposed portion 30y3 thereof are conductive with each other, may be applied to other embodiments and modification/variation examples thereof disclosed in this specification.

Figure 6:
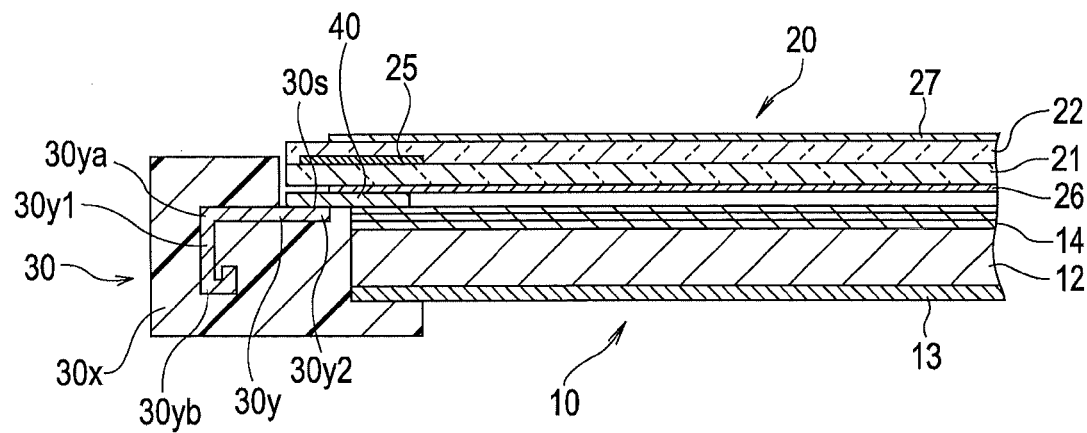
FIG. 6 is a close-up sectional view that schematically illustrates an example of still another cross-sectional shape of the electro-optical device according to the first embodiment of the invention, which is basically the same as that of FIG. 2 except that a metal member has a cross-sectional shape that is not the same as that of FIG. 2.

FIG. 6 is a close-up sectional view that schematically illustrates an example of still another cross-sectional shape of the electro-optical device 100 according to the present embodiment of the invention, which is basically the same as that of FIG. 2 except that the metal member 30y has a cross-sectional shape that is not the same as that of FIG. 2. In the exemplary configuration of the electro-optical device 100 according to the present embodiment of the invention illustrated in FIG. 6, the metal member 30y has a bent region or a curved region 30ya in the embedded portion 30y1 thereof, which is the same as the configuration example illustrated in FIG. 2. However, unlike the configuration example illustrated in FIG. 2, the metal member 30y according to a modification example described herein has, at least, another bent region or another curved region 30yb in the embedded portion 30y1 thereof. Specifically, in the exemplary configuration of the electro-optical device 100 according to the present embodiment of the invention illustrated in FIG. 6, when viewed in a cross section thereof, the metal member 30y extends horizontally from the exposed end/region thereof in an outward direction and is bent at an almost right angle at the end 30ya of a first horizontal portion thereof. The metal member 30y further extends vertically in a downward direction from the bent region 30ya and is further bent inward at an almost right angle at the end 30yb so that the extension therefrom constitutes a second horizontal portion thereof. Having such a structure, the electro-optical device 100 according to the present embodiment of the invention illustrated in FIG. 6 makes it possible to further increase the mechanical strength of the metal member 30y. It should be noted that the cross-sectional shape illustrated in FIG. 6 may be applied to other embodiments and modification/variation examples thereof disclosed in this specification.

Second Embodiment

Figure 7:
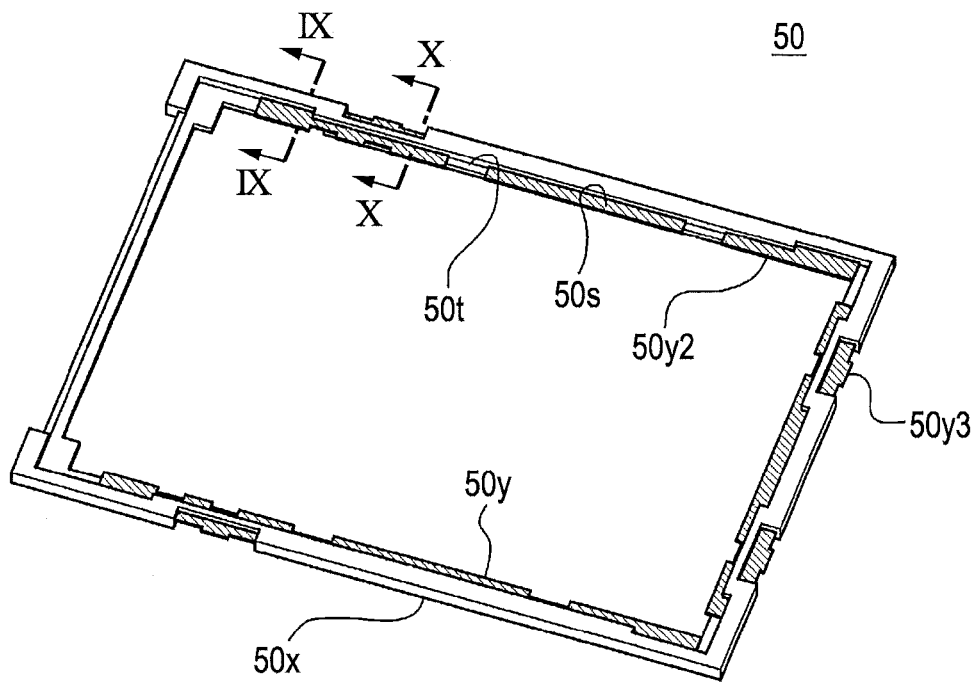
FIG. 7 is a perspective view that schematically illustrates an example of the configuration of a supporting frame that is used for an electro-optical device according to a second embodiment of the invention, where the supporting frame is observed from a certain virtual point above the supporting frame in a downward direction at an oblique/perspective angle.
Figure 8:
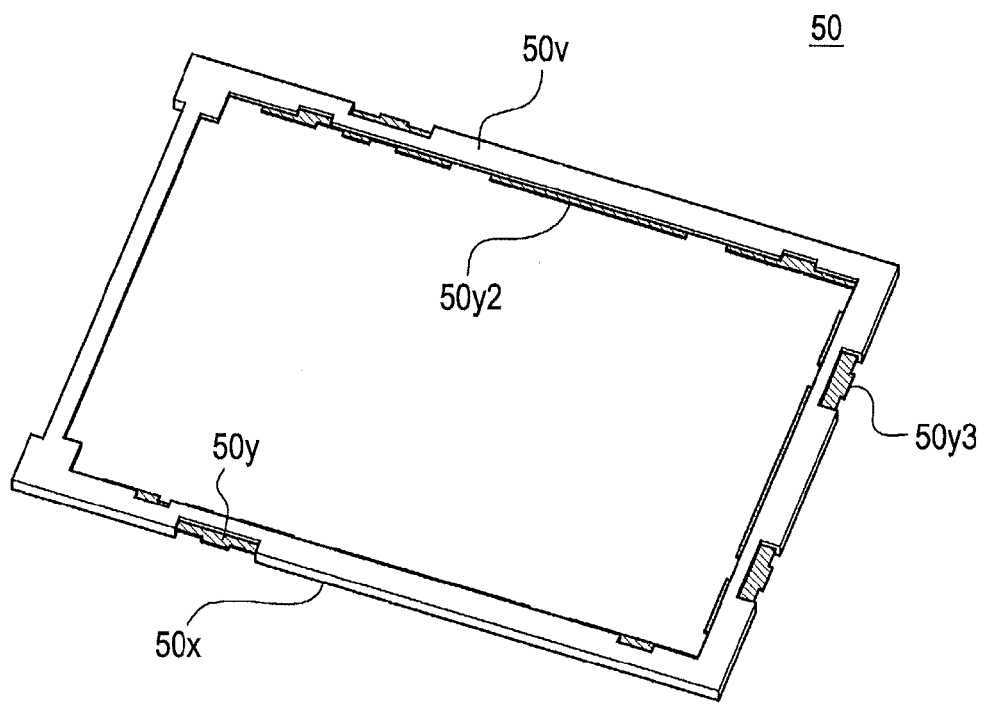
FIG. 8 is another perspective view that schematically illustrates an example of the configuration of the supporting frame illustrated in FIG. 7, where the supporting frame is observed from a certain virtual point below the supporting frame in an upward direction at an oblique/perspective angle.
Figure 9:
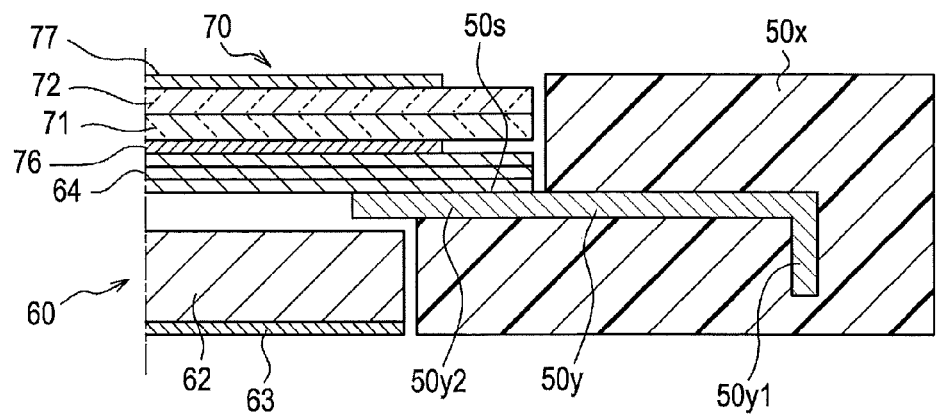
FIG. 9 is a close-up sectional view that schematically illustrates an example of a cross-sectional shape of the supporting frame taken along the line IX-IX of FIG. 7, which is shown together with other inner members/components of an electro-optical device according to the second embodiment of the invention.
Figure 10:
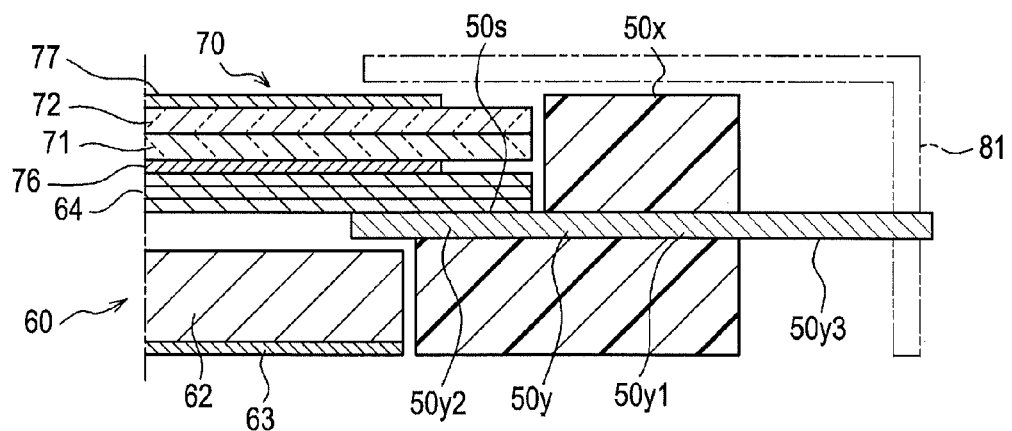
FIG. 10 is another close-up sectional view that schematically illustrates an example of a cross-sectional shape of the supporting frame taken along the line X-X of FIG. 7, which is shown together with other inner members/components of the electro-optical device according to the second embodiment of the invention.

Next, with reference to the accompanying drawings, another exemplary embodiment of the invention is explained in detail below. FIG. 7 is a perspective view that schematically illustrates an example of the configuration of a supporting frame 50 that is used for an electro-optical device according to the second embodiment of the invention, where the supporting frame 50 is observed from a certain virtual point above the supporting frame 50 in a downward direction at an oblique/perspective angle. FIG. 8 is another perspective view that schematically illustrates an example of the configuration of the supporting frame 50 illustrated in FIG. 7, where the supporting frame 50 is observed from a certain virtual point below the supporting frame 50 in an upward direction at an oblique/perspective angle. FIG. 9 is a close-up sectional view that schematically illustrates an example of a cross-sectional shape of the supporting frame 50 taken along the line IX-IX of FIG. 7, which is shown together with other inner members/components of an electro-optical device according to the present embodiment of the invention. FIG. 10 is another close-up sectional view that schematically illustrates an example of a cross-sectional shape of the supporting frame 50 taken along the line X-X of FIG. 7, which is shown together with other inner members/components of an electro-optical device according to the present embodiment of the invention.

The supporting frame 50 has, as its name indicates, the shape of a frame, specifically, a rectangular frame. The supporting frame 50 is made up of a resin base frame member 50x and a metal member 50y, which are formed into a single frame unit by means of an insert molding method. The resin base frame member 50x has the shape of a frame. The metal member 50y is embedded in or exposed at a plurality of regions of the frame-shaped resin base member 50x. In the illustrated example, the metal member 50y is embedded or exposed along three sides of the resin base frame member 50x; that is, the metal member 50y is not embedded or exposed along the remaining one side of the resin base frame member 50x. The resin base frame member 50x covers the base portion of the metal member 50y. Some portion of the metal member 50y is not covered by and thus exposed from the resin base frame member 50x at the inner region thereof. Each of the inner exposed regions of the metal member 50y constitutes an exposed portion 50y2. Other portion of the metal member 50y is also not covered by and thus exposed from the resin base frame member 50x at the outer region thereof. Each of the outer exposed regions of the metal member 50y constitutes an exposed portion 50y3. The uncovered portion 50y2 of the metal member 50y constitutes an inner exposed portion thereof that is exposed from the resin base frame member 50x at the middle face of the inside of the supporting frame 50 viewed along the thickness direction thereof. On the other hand, the uncovered portion 50y3 of the metal member 50y constitutes an outer exposed portion thereof that is exposed from the resin base frame member 50x at the outside thereof.

A portion of the resin base frame member 50x protrudes (i.e., extends) inward inside the supporting frame 50. The protruding face of the resin base frame member 50x constitutes an inner supporting surface 50t of the supporting frame 50. The inner exposed portion 50y2 of the metal member 50y is formed at some places on the protruding inner supporting surface 50t of the supporting frame 50. The upper surface of the inner exposed portion 50y2 of the metal member 50y that is formed on the protruding inner supporting surface 50t of the supporting frame 50 constitutes another level inner supporting surface 50s of the supporting frame 50. The bottom face 50v of the supporting frame 50 is made of the resin base frame member 50x. The bottom face 50v of the supporting frame 50 constitutes a uniformly even surface (i.e., level plane).

As illustrated in FIGS. 9 and 10, an illumination unit 60 and an electro-optical panel 70 are built inside the supporting frame 50. The illumination unit 60 is provided with a plurality of light source elements, an optical waveguide board 62, a reflecting plate 63, and a plurality of optical sheets 64, correctively referred to in a singular form thereof in the following description. Note that the light source is not illustrated in the drawing. Light emitted from the light source propagates inside the optical waveguide board 62 and then goes out from the upper surface thereof. The reflecting plate 13 is provided at the back of, specifically, on the rear face of, the optical waveguide board 62. The optical sheet 64 is provided over the plane of emergence, that is, the upper surface of the optical waveguide board 62 from which light goes out. The electro-optical panel 70 is made up of a substrate 71, another substrate 72, and an electro-optical material that is sandwiched therebetween. Each of the substrates 71 and 72 is made of, for example, glass or the like. A non-limiting example of the electro-optical material that is sandwiched therebetween is liquid crystal. In the illustrated example, the electro-optical panel 70 is configured as a liquid display panel without any intention of limitation thereto, although the liquid crystal (electro-optical material) is not illustrated in the drawing. A polarizing plate, or a polarizing film, 76 is adhered to the outer surface of the substrate 71, which is opposite the electro-optical-material-side surface thereof. On the other hand, a polarizing plate 77 is adhered to the outer surface of the substrate 72.

As illustrated in FIG. 9, the metal member 50y has an embedded portion 50y1 that is covered by the resin base frame member 50x. The metal member 50y further has the aforementioned inner exposed portion 50y2 that is not covered by the resin base frame member 50x and thus exposed inside thereof. The inner exposed portion 50y2 is formed as an inward extension from the embedded portion 50y1 of the metal member 50y. The surface of the inner exposed portion 50y2 constitutes the aforementioned inner supporting surface 50s of the supporting frame 50. The inner supporting surface 50s of the supporting frame 50 provides a support to the optical sheet 64. The electro-optical panel 70 is supported on the optical sheet 64. The electro-optical panel 70 and the optical sheet 64 may be adhered to each other by means of a double-faced adhesive tape or the like that is not shown in the drawing. Or, the electro-optical panel 70 may be engaged with the latch engagement structure of the supporting frame 50. In the latter configuration, the electro-optical panel 70 provides a mechanical hold on the optical sheet 64.

As illustrated in FIG. 10, which shows a cross section taken at a position different from that of FIG. 9, the metal member 50y further has the aforementioned outer exposed portion 50y3 that is not covered by the resin base frame member 50x and thus exposed outside thereof. The outer exposed portion 50y3 is formed as an outward extension from the embedded portion 50y1 of the metal member 50y. The outer exposed portion 50y3 of the metal member 50 is electrically connected to the inner exposed portion 50y2 thereof. The outer exposed portion 50y3 of the metal member 50 is fitted in a chassis (bezel) 81 that is made of a metal material such as a stainless steel or the like. With such a structure, the outer exposed portion 50y3 of the metal member 50 is electrically connected to the outer bezel frame 81. The outer bezel frame 81 has a bent portion. The horizontal portion of the outer bezel frame 81 extends over the supporting frame 50 from the bent portion thereof. With such a structure, the outer bezel frame 81 holds the electro-optical panel 70 from the above.

Likewise the supporting frame 30 (electro-optical device) according to the first embodiment of the invention described above, the supporting frame 50 (electro-optical device) according to the present embodiment of the invention offers the following advantageous effects. Since the resin base frame member 50x and the metal member 50y are formed into a single frame unit, it is possible to increase the mechanical strength of the supporting frame 50. In particular, if the resin base frame member 50x and the metal member 50y are formed into a single frame unit by means of an insert molding method, it is possible to further increase the mechanical strength of the supporting frame 50. The resin base frame member 50x securely supports the back (i.e., bottom) of the inner exposed portion 50y2 of the metal member 50y. In addition, the upper surface of the inner exposed portion 50y2 of the metal member 50y backed by the resin base frame member 50x constitutes the inner supporting surface 50s of the supporting frame 50. Therefore, the use of the upper surface of the inner exposed portion 50y2 of the metal member 50y as the inner supporting surface 50s of the supporting frame 50 ensures a considerable improvement in the precision of the positional determination of member/component supported thereby. In addition, since the inner exposed portion 50y2 of the metal member 50y is in contact with the inner member/component supported inside the supporting frame 50, it is possible to release, that is, discharge, static electricity that is charged in the members/components of the electro-optical device to the metal member 50y. Moreover, it is further possible to release static electricity to the outside of the supporting frame 50 because the outer exposed portion 50y3 of the metal member 50 is electrically connected to the inner exposed portion 50y2 thereof as has already been explained above.

Figure 11:
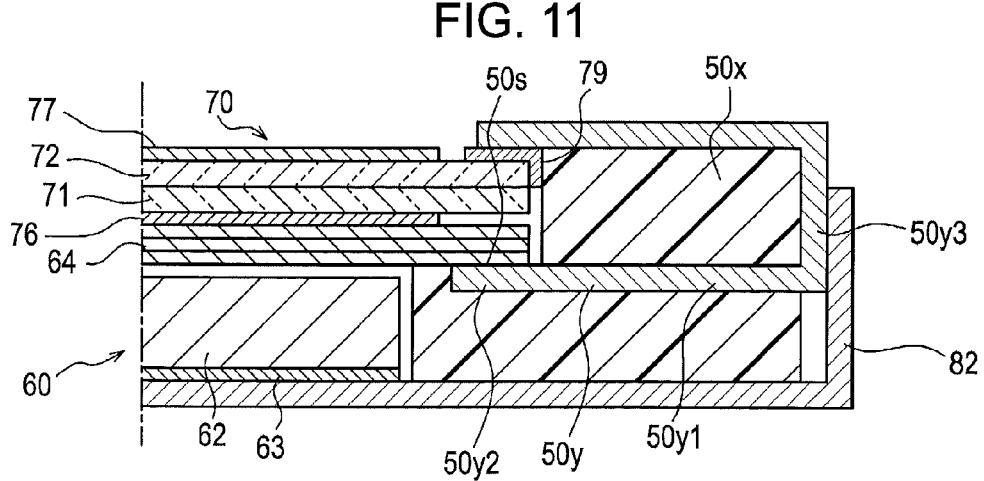
FIG. 11 is still another close-up sectional view that schematically illustrates an example of a cross-sectional shape of the supporting frame according to the second embodiment of the invention.

FIG. 11 is still another close-up sectional view that schematically illustrates an example of a cross-sectional shape of the supporting frame 50 according to the present embodiment of the invention. In the illustrated example, the metal member 50y has the embedded portion 50y1, the inner exposed portion 50y2, and the outer exposed portion 50y3, where the outer exposed portion 50y3 thereof extends upward along an edge surface of the resin base frame member 50x and bent inward to extend along the upper surface of the resin base frame member 50x. At an end region of the horizontal portion thereof, the outer exposed portion 50y3 of the metal member 50y is electrically connected to an external electrode 79, which is formed on the outer surface of the electro-optical panel 70. The external electrode 79 extends from an inner end/face of the substrate 72 to the outer surface thereof. In addition, the outer exposed portion 50y3 of the metal member 50y is electrically connected to a metal frame 82, which is attached to the supporting frame 50. Having such a structure, an electro-optical device according to the present embodiment of the invention makes it possible to release and discharge static electricity to the outside of the supporting frame 50 effectively.

Configuration Example of Electro-Optical Panel

Figure 12:
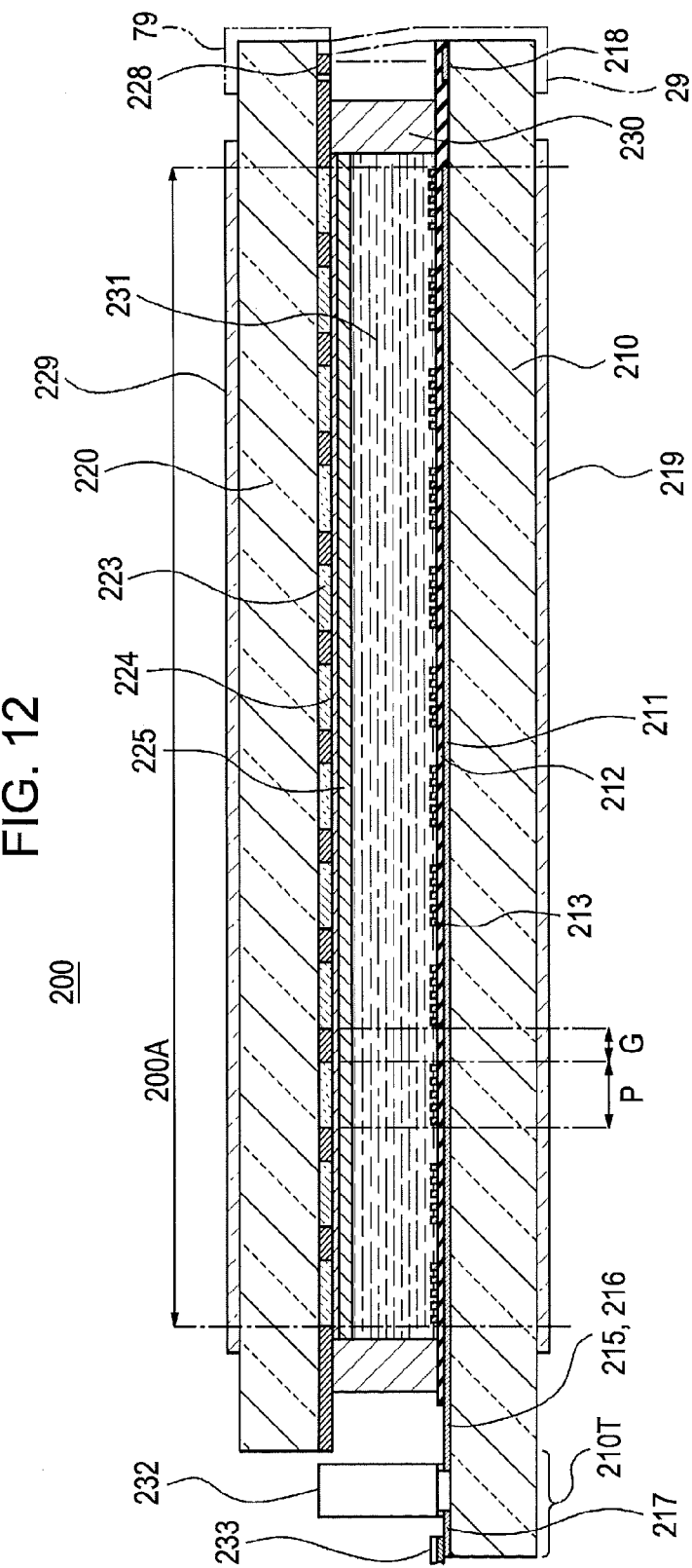
FIG. 12 is a sectional view that schematically illustrates an example of the general configuration of an electro-optical panel that can be adopted in an exemplary embodiment of the invention.

Next, with reference to FIGS. 12 and 13, an explanation is given below of an example of the configuration of an electro-optical panel that is suitably adopted in the configuration of an electro-optical device according to any of the foregoing exemplary embodiments of the invention, including their variation/modification examples thereof. In particular, the configuration of the electro-optical panel explained below is suitably used for the electro-optical device illustrated in FIG. 5 or FIG. 11, though not limited thereto.

The electro-optical panel explained herein is a horizontal-electric-field-type liquid crystal display panel that does not have any electrode on one of a pair of substrates thereof but has two types of electrodes on the other of the pair of substrates so as to apply an electric field to the liquid crystal sandwiched therebetween. FIG. 12 is a sectional view that schematically illustrates an example of the general configuration of a liquid crystal display panel 200 having such a feature. The liquid crystal display panel 200 has substrates 210 and 220 each of which is made of a transparent material such as glass, plastic, or the like. The substrates 210 and 220 are adhered to each other by means of a sealant 230 interposed therebetween so as to constitute a cell structure. Liquid crystal 231 is sealed in the cell structure between the substrates 210 and 220. As illustrated in FIG. 12, the substrate 210 has a protruding region 210T. The protruding region 210T of the substrate 210 extends outward beyond the outer edge of the substrate 220 so that the protruding region 210T of the substrate 210 does not overlap the substrate 220 in a plan view. A polarizing plate, or a polarizing film, 219 is adhered to the outer surface of the substrate 210, which is opposite the liquid-crystal-side surface thereof. On the other hand, a polarizing plate 229 is adhered to the outer surface of the substrate 220.

In a typical exemplary configuration of the liquid crystal display panel 200, an illumination unit (a surface light source) that is not shown in the drawing is provided adjacent to the substrate 210. Light emitted by the illumination unit passes through the polarizing plate 219, the substrate 210, the liquid crystal 231, the substrate 220, and the polarizing plate 229 in a sequential manner in the order of appearance herein. By this means, light is subjected to optical modulation for each sub pixel P. As a result thereof, a desired image is displayed on the display area 200A of the liquid crystal display panel 200.

Figure 13A:
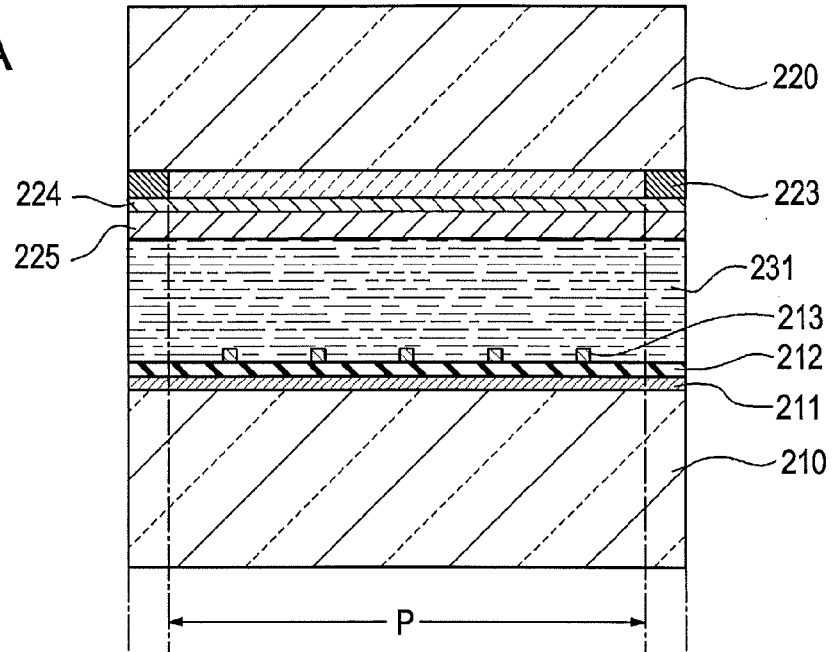

Next, the inner configuration of the liquid crystal display panel 200 between the substrates 210 and 220 thereof is explained below. FIG. 13A is a close-up sectional view that schematically illustrates an example of the configuration of one sub pixel P of the liquid crystal display panel 200. In this example, it is assumed that the liquid crystal display panel 200 is an FFS (Fringe Field Switching) liquid crystal display panel, which is an example of horizontal-electric-field modes. Notwithstanding the foregoing, the liquid crystal display panel 200 may be an IPS (In-Plane Switching) liquid crystal display panel, which is another example of horizontal-electric-field modes.

As has already been described above, the liquid crystal display panel 200 is mainly made up of the substrates 210 and 220 with the liquid crystal 231 being sandwiched therebetween. A common electrode 211 is formed as a planar electrode, that is, surface electrode, on the inner surface of the substrate 210. The common electrode 211 is made of an optically transparent electro-conductive material such as ITO (Indium Tin Oxide) or the like. An insulation layer 212 is formed as a planar insulation film on the surface of the common electrode 211. The insulation layer 212 is made of an acrylic resin or the like. The insulation layer 212 covers the common electrode 211. A pixel electrode 213 is, formed on the surface of the insulation layer 212. The pixel electrode 213 is made of an optically transparent electro-conductive material such as ITO or the like. An alignment mark 218 is formed on a partial region of the inner surface of the substrate 210. In the illustrated example, the alignment mark 218 is formed at a region outside the sealing material 230. The alignment mark 218 is used in combination with an opposite alignment mark 228, which will be described later, so as to help the positional adjustment of the substrates 210 and 220 when they are adhered to each other.

On the other hand, a color filter layer 223 is formed on the inner surface of the substrate 220. A protection film 224 is formed, though it may be omitted, on the inner surface of the color filter layer 223. An alignment film (i.e., orientation film) 225 is formed on the inner surface of the protection film 224. The aforementioned alignment mark 228 is formed on a partial region of the color filter layer 223. In the illustrated example, the alignment mark 228 is formed at a region outside the sealing material 230. The alignment mark 228 is formed at a position corresponding to that of the aforementioned alignment mark 218 so that the positional adjustment can be made while using these alignment marks 218 and 228 as an alignment reference.

Figure 13B:
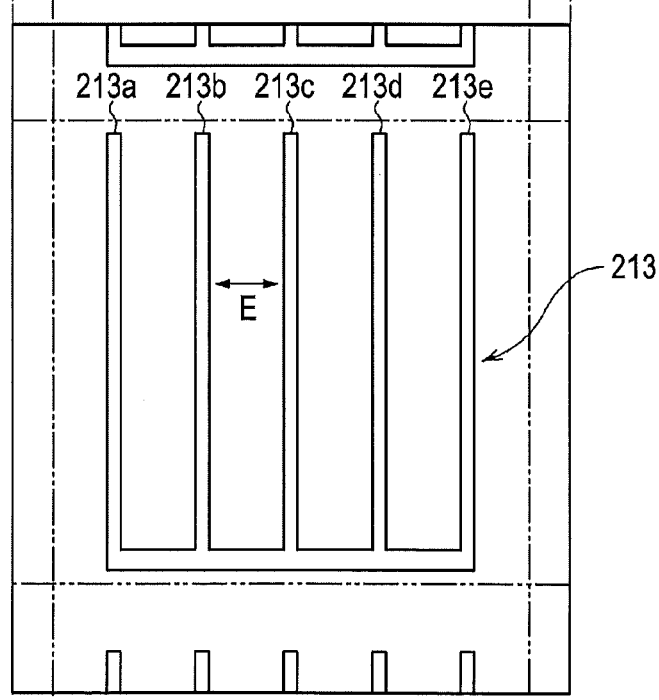
FIG. 13B is a plan view that schematically illustrates an example of the configuration of a pixel electrode thereof.

FIG. 13B is a plan view that schematically illustrates an example of the configuration of the pixel electrode 213. As illustrated in FIG. 13B, the pixel electrode 213 has the shape of the teeth of a comb. Specifically, the pixel electrode 213 has electro-conductive comb-teeth portions 213a, 213b, 213c, 213d, and 213e that are arrayed as a stripe pattern, each of which is a linear extension parallel with others thereof. These electro-conductive comb-teeth portions 213a, 213b, 213c, 213d, and 213e are connected with each other at the spine portion of the comb-like pixel electrode 213. The liquid crystal display panel 200 generates a horizontal electric field E between each of the electro-conductive comb-teeth portions 213a, 213b, 213c, 213d, and 213e of the pixel electrode 213 and the common electrode 211.

Referring back to FIG. 12, the liquid crystal display panel 200 having the configuration explained above has a plurality of sub pixels P arrayed in the display area 200A thereof. Each of the sub pixels P contains one of a plurality of color components of the filter region formed in the color filter layer 223. The sub pixels P occupy an area that corresponds to the filter region. An inter-sub-pixel gap region G, which serves as a light-shielding region, is formed at each of a clearance between one sub pixel P and another sub pixel P that are arrayed adjacent to each other. The light-shielding layer formed in the color filter layer 223 shields this region. By this means, it is possible to prevent any optical leakage that is attributable to the alignment/orientation state of the liquid crystal 231 in the inter-sub-pixel gap region G at which control exerted by the electric field E is insufficient, thereby ensuring an excellent display quality.

In the illustrated exemplary configuration of the liquid crystal display panel 200, the color filter layer 223 is formed over the entire region of the inner surface of the substrate 220. With such a structure, it is possible to eliminate selective coating/disposition processing or patterning processing in the formation process of the color filter layer 223. Notwithstanding the foregoing, depending on the adhesiveness of the sealant 230, the thickness of the liquid crystal 231, and/or other factor(s), the color filter layer 223 may be formed selectively only at a region inside the sealing material 230.

A driving circuit 232 is directly mounted, by means of a COG (Chip On Glass) technique, on the surface of the protruding region 210T of the substrate 210. The driving circuit 232 is configured as a liquid-crystal-driving IC (driver). An FPC (Flexible Printed Circuit) board 233 is provided at the end region of the liquid crystal display panel 200. A wiring patterns/lines 215, 216, and 217 are formed on the surface of the protruding region 210T of the substrate 210. These wires/lines 215, 216, and 217 are formed as a patterned copper foil. A photo-etching method is used to pattern the wires/lines 215, 216, and 217, though not limited thereto. Some terminals of the driving circuit 232 are electrically connected to the FPC 233 via the wire/line 217 that is formed on the surface of the protruding region 210T of the substrate 210.

The common electrode 211 is electrically connected to the common-electric-potential terminal (i.e., COM terminal) of the driving circuit 232 via the wire/line 215 that is formed on the surface of the protruding region 210T of the substrate 210. On the other hand, the pixel electrodes 213 are electrically connected to some terminals of the driving circuit 232 via the wire/line 216 that is formed on the surface of the protruding region 210T of the substrate 210. It should be noted that the wire/line 216 is formed at a cross-sectional position that is not the same as that of the wire/line 215 shown in FIG. 12. On the basis of a control signal that is supplied from an external electronic apparatus via the FPC 233, the driving circuit 232 determines the intensity of the electric field E. The liquid crystal display panel 200, which is a horizontal-electric-field-type liquid crystal display panel, controls the intensity of the electric field E so as to change the alignment/orientation state of liquid crystal molecules of the liquid crystal 231. By this means, the liquid crystal display panel 200 changes gradation on the display screen thereof.

The liquid crystal display panel 200 explained above does not have any electrode on the inner surface of the substrate 220 but has two types of electrodes, that is, the common electrode 211 and the pixel electrodes 213, on the inner surface of the substrate 210. Having such a configuration, the liquid crystal display panel 200 applies a predetermined driving voltage between the common electrode 211 and the pixel electrodes 213 so as to drive the liquid crystal 231 that is sandwiched between the substrate 210 and the substrate 220. Therefore, if the inner surface of the substrate 220 is electrified (i.e., charged), the electrostatic force adversely affects the electric field applied to the liquid crystal 231. As a result thereof, the display quality of the liquid crystal display panel 200 is degraded. In the illustrated example, either the external electrode 29 that is shown by an alternate long and short dash line or the external electrode 79 that is shown by an alternate long and two short dashes line (i.e., two-dot chain line) is provided as in the foregoing exemplary configuration illustrated in FIG. 5 or FIG. 11. With such a structure, it is possible to release and discharge static electricity to the outside thereof so as to ensure the excellent display quality of the liquid crystal display panel 200.

Electronic Apparatus

Figure 14:
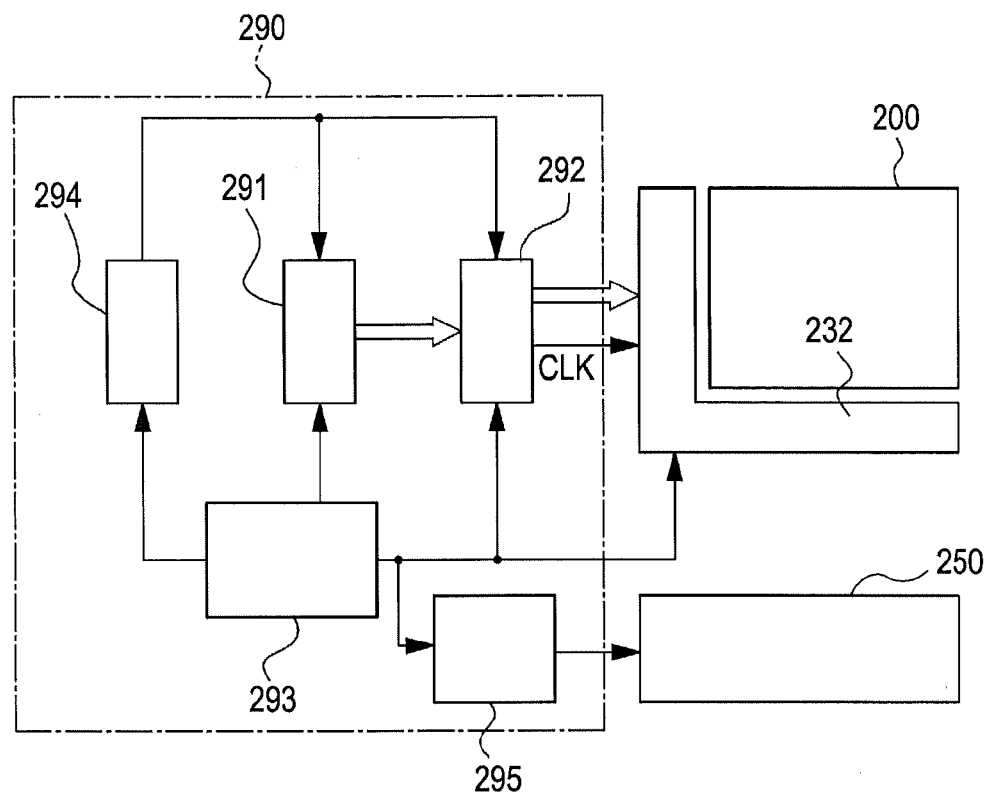
FIG. 14 is a block diagram that shows the general configuration of a controlling system that controls the display of an electro-optical panel that is built in an electronic apparatus according to an exemplary embodiment of the invention.

Finally, an explanation is given below of an example of an electronic apparatus that is provided with the electro-optical device according to any of the foregoing exemplary embodiments of the invention including their modification/variation examples thereof. The electronic apparatus explained herein has the liquid crystal display panel 200 described above as its display unit/portion. FIG. 14 is a block diagram that shows the general configuration of a controlling system that controls the display of the liquid crystal display panel 200 that is built in the electronic apparatus. The electronic apparatus illustrated in FIG. 14 has a display control circuit 290. The display control circuit 290 of the electronic apparatus includes a display information output source 291, a display information processing circuit 292, a power-supply circuit 293, a timing generator 294, and a light-source control circuit 295. The light-source control circuit 295 supplies power to a backlight 250. The electro-optical device (liquid crystal display device) is provided with the liquid crystal display panel 200 that has the configuration explained above, the driving circuit 232 that drives the liquid crystal display panel 200, and the backlight 250 that illuminates the liquid crystal display panel 200. The driving circuit 232 is made up of electronic parts/components that are directly mounted on the liquid crystal display panel 200 as explained above. Notwithstanding the foregoing, the driving circuit 232 may be configured as a circuit pattern that is formed on the surface of the substrate of the liquid crystal display panel 200. Or, as another non-limiting example thereof, the driving circuit 232 may be configured as a semiconductor IC chip, a circuit pattern, or the like that is mounted/formed on a circuit substrate (e.g., the above-described FPC 233) that is electrically connected to the liquid crystal display panel 200.

The display information output source 291 has a memory that is constituted by ROM (Read Only Memory), RAM (Random Access Memory), etc., a storage unit that is constituted by a magnetic recording disk, an optical recording disk, etc., and a tuning circuit that provides a "tuned-output" of a digital image signal. The display information output source 291 is configured to supply display information to the display information processing circuit 292 in the form of image signals having a predetermined format based on various clock signals generated by the timing generator 294.

The display information processing circuit 292 is provided with various kinds of well-known circuits including but not limited to a serial-parallel conversion circuit, an amplifier/inverter circuit, a rotation circuit, a gamma correction circuit, and a clamping circuit. The display information processing circuit 292 performs the processing of the inputted display information to supply image information thereof together with a clock signal CLK to the driving circuit 232. The driving circuit 232 includes, though not necessarily limited thereto, a scanning line driving circuit, a signal line driving circuit, and a test circuit. The power-supply circuit 293 supplies a predetermined power voltage to each of the constituent elements of the electronic apparatus described above.

The light-source control circuit 295 supplies power to the backlight 250 (light source) on the basis of power voltage supplied thereto from the power-supply circuit 293. In addition, on the basis of a predetermined control signal, the light-source control circuit 295 controls the ON/OFF state of the light source, the brightness level thereof, and the like.

Figure 15:
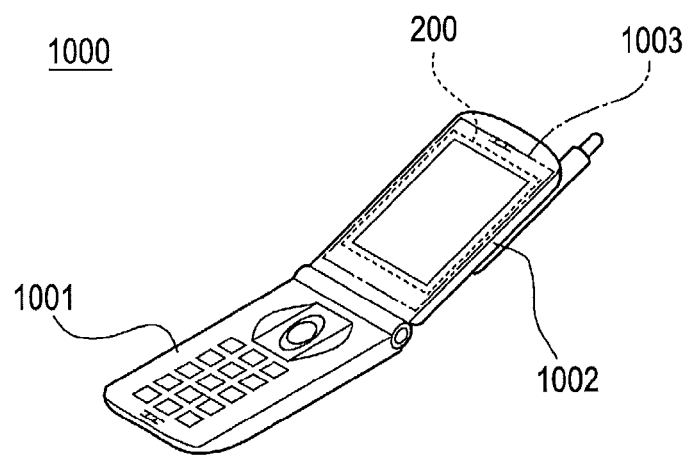
FIG. 15 is a diagram that schematically illustrates the general appearance of a mobile phone, which is an electronic apparatus according to an exemplary embodiment of the invention.

FIG. 15 is a diagram that schematically illustrates the general appearance of a mobile phone, which is an electronic apparatus according to an exemplary embodiment of the invention. As illustrated in the drawing, a mobile phone 1000 is provided with a manual operation unit 1001 that includes a plurality of manual operation buttons, a mouthpiece, and the like and a display unit 1002 that includes an earpiece and the like. The liquid crystal display panel 200 described above is built in the display unit 1002 of the mobile phone 1000. With such a configuration, a user can view the display area 200A (refer to FIG. 12) of the liquid crystal display panel 200 on the surface (inner face) of the display unit 1002 of the mobile phone 1000. The display control circuit 290 described above, which controls the operation of the liquid crystal display panel 200, is built as an inner component of the mobile phone 1000. The display control circuit 290 determines the display mode of the liquid crystal display panel 200.

Among a variety of electronic apparatuses to which the liquid crystal display panel 200 (and an electro-optical device according to an exemplary embodiment of the invention) is applicable are, other than the mobile phone illustrated in FIG. 15, a liquid crystal television, a car navigation device, a pager, an electronic personal organizer, an electronic calculator, a workstation, a videophone, a POS terminal, and so forth. It is possible to use the liquid crystal display device (electro-optical device) according to an exemplary embodiment of the invention as the display unit/portion of a variety of electronic apparatuses including those enumerated above though not limited thereto.

Although various exemplary embodiments of the present invention as well as their modification/variation examples thereof are described above with the accompanying illustrations, needless to say, the invention is in no case restricted to these exemplary embodiments and modification/variation examples described herein; the invention may be configured in an adaptable manner in a variety of other variations and/or modifications not specifically described or illustrated herein without departing from the spirit thereof. For example, in the foregoing exemplary embodiments of the invention and their modification/variation examples thereof, a liquid crystal display device that has a liquid crystal display panel is taken as an example of an electro-optical device. However, needless to say, the electro-optical device to which the invention is applicable should be in no case understood to be limited to the liquid crystal display device. The invention is also applicable to other types of electro-optical devices including but not limited to an organic electroluminescence (EL) display device or an electrophoresis display device.

What is claimed is:

1. An electro-optical device comprising:
   an electro-optical panel;
   a supporting frame of the electro-optical device that supports the electro-optical panel either directly or indirectly;
   a resin base frame member that composes the supporting frame; and
   a metal member integrally formed with and extending along at least substantial portions of the length and/or width of the resin base frame, the metal member including an embedded portion that is covered inside the resin base frame member and an exposed portion that is exposed from the resin base frame member,
   wherein the exposed portion of the metal member has an inner exposed portion that is exposed at a middle face of the inside of the supporting frame viewed along the thickness direction of the supporting frame; and
   at least one of the electro-optical panel, which is supported inside the supporting frame, and other member is in contact with the inner exposed portion of the metal member,
   wherein the embedded portion of the metal member has a bent cross-sectional shape taken along a section of the supporting frame, and the bend of the metal member occurs in the interior of the resin base frame member.

2. The electro-optical device according to claim 1, wherein the exposed portion of the metal member has an outer exposed portion that is exposed at the outside of the supporting frame; and
   the inner exposed portion of the metal member and the outer exposed portion of the metal member are conductively connected with each other.

3. The electro-optical device according to claim 1, wherein the surface of the inner exposed portion of the metal member constitutes at least a part of a supporting surface of the supporting frame that supports at least one of the electro-optical panel, which is supported inside the supporting frame, and the above-mentioned other member.

4. The electro-optical device according to claim 1, the electro-optical device further having a surface illumination device that overlaps the electro-optical panel in a plan view,
   wherein the supporting frame supports members that make up the surface illumination device.

5. The electro-optical device according to claim 1, wherein an external electrode is formed on the outer surface of the electro-optical panel; and
   the external electrode is electrically connected to the exposed portion of the metal member.

6. The electro-optical device according to claim 1, wherein the metal member is made of a metal plate material.

7. An electronic apparatus that is provided with the electro-optical device according to claim 1 and a control section that controls the electro-optical device.

* * * * *